United States Patent
Kang et al.

(10) Patent No.: US 9,723,526 B2
(45) Date of Patent: Aug. 1, 2017

(54) APPARATUS AND METHOD FOR FORWARDING HANDOVER DATA IN WIRELESS COMMUNICATION SYSTEM

(75) Inventors: Seong-Ryong Kang, Seongnam-si (KR); Byung-Suk Kim, Seoul (KR); Han-Seok Kim, Seoul (KR); Dong-Sook Kim, Hwaseong-si (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 736 days.

(21) Appl. No.: 13/329,037

(22) Filed: Dec. 16, 2011

(65) Prior Publication Data

US 2012/0155431 A1    Jun. 21, 2012

(30) Foreign Application Priority Data

Dec. 16, 2010 (KR) ........................ 10-2010-0128852

(51) Int. Cl.
| | | |
|---|---|---|
| H04W 36/00 | (2009.01) | |
| H04W 36/02 | (2009.01) | |
| H04L 12/863 | (2013.01) | |
| H04W 72/12 | (2009.01) | |
| H04L 12/865 | (2013.01) | |

(52) U.S. Cl.
CPC ......... *H04W 36/023* (2013.01); *H04L 47/621* (2013.01); *H04L 47/623* (2013.01); *H04L 47/6225* (2013.01); *H04L 47/6275* (2013.01); *H04W 72/1236* (2013.01)

(58) Field of Classification Search
None
See application file for complete search history.

(56) References Cited

U.S. PATENT DOCUMENTS

| | | | |
|---|---|---|---|
| 6,469,991 B1* | 10/2002 | Chuah | 370/329 |
| 6,891,835 B2* | 5/2005 | Kalkunte et al. | 370/395.41 |
| 7,023,843 B2* | 4/2006 | Ruutu et al. | 370/388 |
| 8,442,534 B2* | 5/2013 | Hapsari et al. | 455/436 |
| 8,588,181 B2* | 11/2013 | Ahluwalia | 370/331 |
| 8,630,256 B2* | 1/2014 | Tinnakornsrisuphap et al. | 370/331 |
| 8,718,016 B2* | 5/2014 | Izawa et al. | 370/331 |
| 2005/0094586 A1* | 5/2005 | Zhang et al. | 370/310 |
| 2007/0286125 A1* | 12/2007 | Lee et al. | 370/331 |
| 2009/0117902 A1* | 5/2009 | Park et al. | 455/436 |
| 2010/0002650 A1* | 1/2010 | Ahluwalia | 370/331 |

(Continued)

FOREIGN PATENT DOCUMENTS

KR    20090046603 A    5/2009

OTHER PUBLICATIONS

Korean Intellectual Patent Office, "Notice of Preliminary Rejection," Application No. 10-2010-0128852, Oct. 21, 2016, publisher KIPO, Daejeon, Republic of Korea.

*Primary Examiner* — Robert C Scheibel

(57) ABSTRACT

A technique forwards handover data in a wireless communication system. A base station apparatus includes a first buffer for storing downlink data of a terminal, a handover agent for, when the terminal performs a handover, performing scheduling on data which is stored in the first buffer for at least one terminal including the terminal that performs the handover so that an interruption time of the at least one terminal is reduced in order to forward the data to a target base station, and a communication unit for transmitting the data according to a scheduling result of the handover agent.

20 Claims, 6 Drawing Sheets

(56) References Cited

U.S. PATENT DOCUMENTS

| | | |
|---|---|---|
| 2010/0172322 A1 | 7/2010 | Yokota |
| 2010/0216471 A1* | 8/2010 | Meyer et al. ............... 455/436 |
| 2010/0265823 A1* | 10/2010 | Zhao et al. ................ 370/233 |
| 2011/0002304 A1* | 1/2011 | Lee et al. .................. 370/331 |
| 2012/0051349 A1* | 3/2012 | Teyeb et al. ............... 370/338 |
| 2012/0140633 A1* | 6/2012 | Stanwood et al. ........... 370/235 |
| 2012/0243461 A1* | 9/2012 | Bucknell et al. ............ 370/315 |

* cited by examiner

APPARATUS AND METHOD FOR FORWARDING HANDOVER DATA IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Dec. 16, 2010 and assigned Serial No. 10-2010-0128852, the entire disclosure of which is hereby incorporated by reference.

TECHNICAL FIELD OF THE INVENTION

The present invention relates to a wireless communication system.

BACKGROUND OF THE INVENTION

A wireless communication system provides a user with a communication service by using a radio channel. The wireless communication system includes a user terminal and a plurality of base stations for performing wireless communication. The base stations provide wireless access to terminals located in a geographical area that covers a certain range. The geographical area is called a cell. Therefore, when the terminals move from one place to another, a cell in which the wireless access is provided to each terminal may change. Accordingly, the number of terminals located in each cell also change.

When a serving base station, that is, a base station to which wireless access is provided, changes due to the movement of the terminal, it is called a handover. When the terminal performs the handover, if the base station has buffered data to be transmitted to the terminal, the base station can deliver to a target base station the data to be transmitted to the terminal through a backhaul network, and thus can prevent the data from loss. In order to forward handover data, the base station based on the conventional technique inputs buffered data to a buffer of an uplink scheduler so that the data is transmitted in a competitive manner with respect to uplink data.

However, the following problem may arise when the data which is forwarded due to the handover is input to the buffer of the uplink scheduler. When a plurality of terminals perform the handover, traffic of a terminal which first starts the handover results in a forwarding delay in data of a terminal which starts the handover at a later time, and thus a handover data interruption time increases. As a result, there is a decrease in a service satisfactory level of a user of the terminal which starts the handover at the later time. In addition, since capacity of a backhaul network is limited, an overflow may occur in the buffer of the uplink scheduler, which may lead to a packet loss and a decrease in a data transfer rate.

Accordingly, there is a need for a method for solving the aforementioned problems when data of a terminal which performs a handover is forwarded in a wireless communication system.

SUMMARY OF THE INVENTION

To address the above-discussed deficiencies of the prior art, it is a primary aspect of the present disclosure to provide an apparatus and method for reducing an interruption time when handover data is forwarded in a wireless communication system.

Another aspect of the present disclosure is to provide an apparatus and method for avoiding a buffer overflow caused by forwarding of handover data in a wireless communication system.

In accordance with an aspect of the present disclosure, a base station apparatus in a wireless communication system is provided. The apparatus includes a first buffer for storing downlink data of a terminal, a handover agent for, when the terminal performs a handover, performing scheduling on data which is stored in the first buffer and which belongs to at least one terminal including the terminal that performs the handover so that an interruption time of the at least one terminal is reduced in order to forward the data to a target base station, and a communication unit for transmitting the data according to a scheduling result of the handover agent.

In accordance with another aspect of the present disclosure, a method of operating a base station in a wireless communication system is provided. The method includes storing downlink data of a terminal, when the terminal performs a handover, performing scheduling on data which is stored in the first buffer and which belongs to at least one terminal including the terminal that performs the handover so that an interruption time of the at least one terminal is reduced in order to forward the data to a target base station, and transmitting the data according to a scheduling result of the handover agent.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
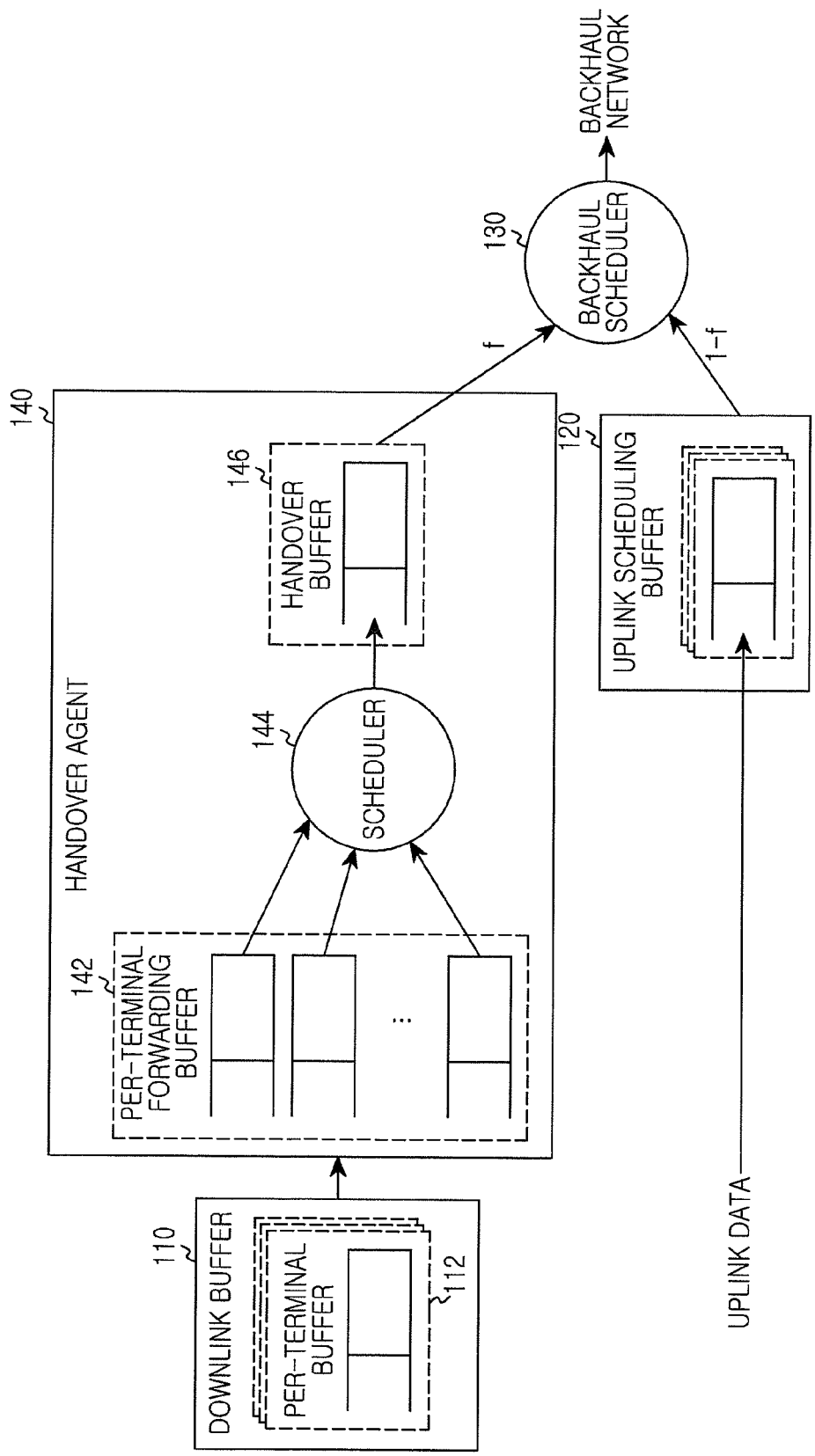
FIG. 1 illustrates a logical structure of a base station which forwards handover data in a wireless communication system according to an exemplary embodiment of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system The present disclosure described hereinafter relates to a technique for reducing an interruption time when handover data is forwarded in a wireless communication system. The present disclosure relates to a technique for forwarding data of a terminal to a target base station when a handover of the terminal is performed in the wireless communication system.

A base station of the present disclosure includes a buffer for a layer that processes an Internet Protocol (IP) packet (hereinafter, a 'downlink buffer'). The buffer includes a plurality of buffers for respective terminals. A buffer for each terminal stores downlink IP layer data of each terminal, and upon receiving ACKnowledge (ACK) for reporting transmission completion from a lower layer, deletes the data. Therefore, the base station forwards the terminal's downlink data stored in the buffer to a target base station when the terminal performs a handover. The forwarding process will be described below in greater detail. For convenience of description, 'data to be forwarded to a target base station and belonging to a terminal which performs a handover' is called 'forwarding data' in the present disclosure.

The base station includes a handover agent to forward the data. The handover agent schedules the forwarding data. That is, the handover agent schedules transmission of data which is forwarded to prevent terminals which perform the handover from experiencing an inconsistent interruption time. For example, the scheduling may be based on a round robin (RR) scheme, a weighted RR (WRR) scheme, etc.

According to exemplary embodiments of the present disclosure, the handover agent may include a per-terminal buffer for temporarily storing the forwarding data (hereinafter, a 'per-terminal forwarding buffer'). In this example, the handover agent performs scheduling on data stored in the per-terminal forwarding buffer. According to another exemplary embodiment of the present disclosure, the handover agent may not include the per-terminal forwarding buffer, and thus may read the forwarding data directly from the downlink buffer.

According to exemplary embodiments of the present disclosure, the handover agent may include a buffer for temporarily storing scheduled forwarding data (hereinafter, a 'handover buffer'). When using the handover buffer, the scheduled forwarding data can be directly transmitted to a target base station through a backhaul network without being subjected to an uplink scheduling buffer. According to another exemplary embodiment of the present disclosure, the handover agent may not include the handover buffer, and thus may drain the scheduled forwarding data to the uplink scheduling buffer.

Hereinafter, a logical structure of the handover agent will be described in detail with reference to the accompanying drawings according to exemplary embodiments of the present disclosure.

FIG. 1 illustrates a logical structure of a base station which forwards handover data in a wireless communication system according to an exemplary embodiment of the present disclosure.

Referring to FIG. 1, the base station includes a downlink buffer 110, an uplink scheduling buffer 120, a backhaul scheduler 130, and a handover agent 140.

The downlink buffer 110 stores downlink data of an IP layer and deletes the data upon receiving ACK for reporting transmission completion from a lower layer. The downlink buffer 110 consists of per-terminal buffers 112. That is, the per-terminal buffers 112 are allocated in accordance with the number of accessed terminals, and the downlink data is stored for each terminal.

The uplink scheduling buffer 120 temporarily stores uplink data received from the terminals, and outputs the stored uplink data according to a scheduling result of the backhaul scheduler 130. The backhaul scheduler 130 schedules data forwarding and uplink transmission of the base station. For example, the backhaul scheduler 130 can perform scheduling based on a WRR scheme. In this example, the backhaul scheduler 130 can assign the same weight to the uplink data and the forwarding data or can assign a greater weight to one of the two. Specific values of weights assigned to the uplink data and the forwarding data may vary depending on intentions of those who implement the present disclosure and a service policy of a system to which the present disclosure applies.

The handover agent 140 outputs forwarding data of the terminals so as to minimize (or reduce) a deviation of interruption times of the terminals which perform a handover. More specifically, the handover agent 140 generates a per-terminal forwarding buffer 142 when performing the handover of the terminal. Thereafter, the handover agent 140 reads the forwarding data of the terminal from the downlink buffer 110, and stores the data into the per-terminal forwarding buffer 142. The per-terminal forwarding buffer 142 is removed after the forwarding data of the terminal is entirely output. A scheduler 144 of the handover agent 140 performs scheduling on forwarding data stored per terminal in the per-terminal forwarding buffer 142. According to one exemplary embodiment of the present disclosure, the scheduler 144 performs scheduling based on an RR scheme. According to another exemplary embodiment of the present disclosure, the scheduler 144 performs scheduling based on the WRR scheme in which different weights are applied in accordance with a service level of the terminal. According to still another exemplary embodiment of the present disclosure, the scheduler 144 performs scheduling so that 'N' number of pre-defined packets is sequentially extracted from the forwarding data of each terminal. For example, when forwarding data of terminals A, B, and C is stored, the scheduler 144 extracts N packets from the forwarding data of the terminal A, then extracts N packets from the forwarding data of the terminal B, and then extracts N packets from the forwarding data of the terminal C, and such a process is repeated. The scheduler 144 stores the forwarding data into a handover buffer 146 in an order by which data is transmitted according to a scheduling result. In this example, the scheduler 144 outputs data to the handover buffer 146 at a speed at which data is output to a backhaul network by the backhaul scheduler 130, that is, in a range not exceeding a data transfer rate of the backhaul network. The forwarding data stored in the handover buffer 146 is output according to the scheduling result of the backhaul scheduler 130, and is delivered to a target base station through the backhaul network.

Figure 2:
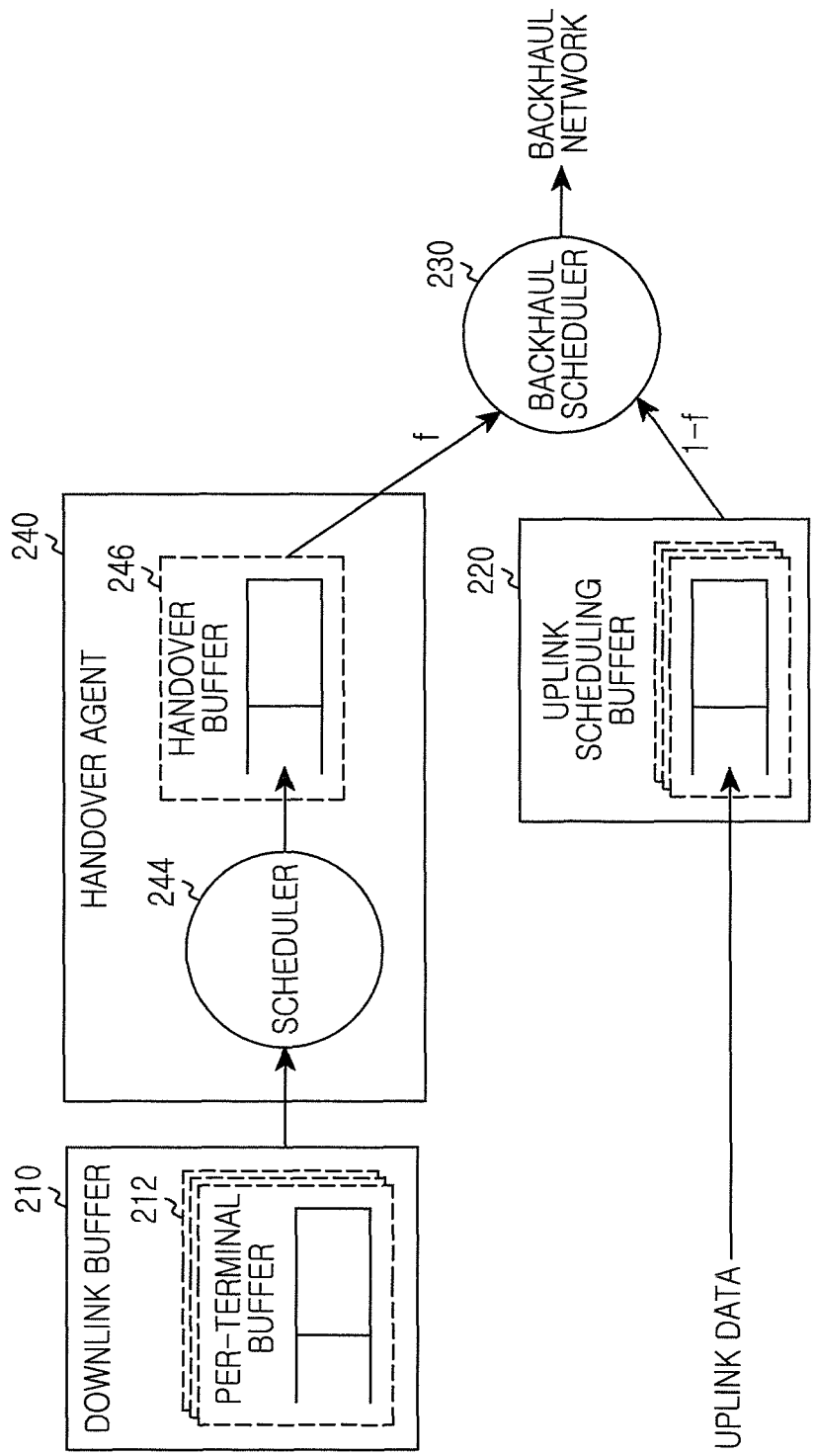
FIG. 2 illustrates a logical structure of a base station which forwards handover data in a wireless communication system according to another exemplary embodiment of the present disclosure.

FIG. 2 illustrates a logical structure of a base station which forwards handover data in a wireless communication system according to another exemplary embodiment of the present disclosure.

Referring to FIG. 2, the base station includes a downlink buffer 210, an uplink scheduling buffer 220, a backhaul scheduler 230, and a handover agent 240.

The downlink buffer 210 stores downlink data of an IP layer and deletes the data upon receiving an acknowledgement (ACK) for reporting transmission completion from a lower layer. The downlink buffer 210 consists of per-terminal buffers 212. That is, the per-terminal buffers 212 are allocated in accordance with the number of accessed terminals, and the downlink data is stored for each terminal.

The uplink scheduling buffer 220 temporarily stores uplink data received from the terminals, and outputs the stored uplink data according to a scheduling result of the backhaul scheduler 230. The backhaul scheduler 230 schedules data forwarding and uplink transmission of the base station. For example, the backhaul scheduler 230 can perform scheduling based on a WRR scheme. In this example, the backhaul scheduler 230 can assign the same weight to the uplink data and the forwarding data or can assign a greater weight to one of the two. Specific values of weights assigned to the uplink data and the forwarding data may vary depending on intentions of those who implement the present disclosure and a service policy of a system to which the present disclosure applies.

The handover agent 240 outputs forwarding data of the terminals so as to minimize (or reduce) a deviation of interruption times of the terminals which perform a handover. More specifically, a scheduler 244 of the handover agent 240 performs scheduling on forwarding data stored per terminal in the per-terminal buffer 212 of the downlink buffer 210. According to one exemplary embodiment of the present disclosure, the scheduler 244 performs scheduling based on an RR scheme. According to another exemplary embodiment of the present disclosure, the scheduler 244 performs scheduling based on the WRR scheme in which different weights are applied in accordance with a service level of the terminal. According to still another exemplary embodiment of the present disclosure, the scheduler 244 performs scheduling so that 'N' number of pre-defined packets is sequentially extracted from the forwarding data of each terminal. For example, when forwarding data of terminals A, B, and C is stored, the scheduler 244 extracts N packets from the forwarding data of the terminal A, then extracts N packets from the forwarding data of the terminal B, and then extracts N packets from the forwarding data of the terminal C, and such a process is repeated. The scheduler 244 stores the forwarding data into a handover buffer 246 in an order by which data is transmitted according to a scheduling result. In this example, the scheduler 244 outputs data to the handover buffer 246 at a speed at which data is output to a backhaul network by the backhaul scheduler 230, that is, in a range not exceeding a data transfer rate of the backhaul network. The forwarding data stored in the handover buffer 246 is output according to the scheduling result of the backhaul scheduler 230, and is delivered to a target base station through the backhaul network.

Figure 3:
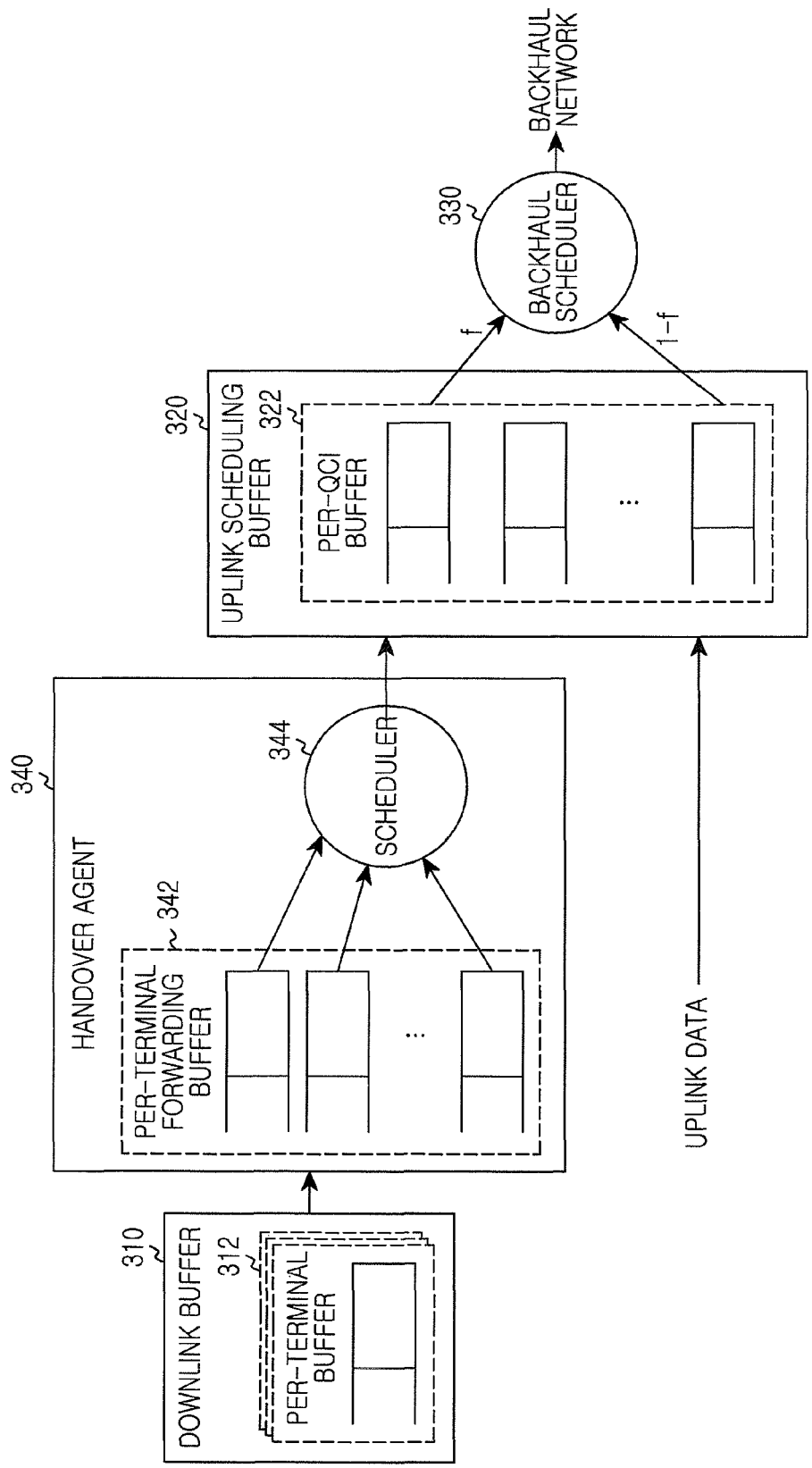
FIG. 3 illustrates a logical structure of a base station which forwards handover data in a wireless communication system according to another exemplary embodiment of the present disclosure.

FIG. 3 illustrates a logical structure of a base station which forwards handover data in a wireless communication system according to another exemplary embodiment of the present disclosure.

Referring to FIG. 3, the base station includes a downlink buffer 310, an uplink scheduling buffer 320, a backhaul scheduler 330, and a handover agent 340.

The downlink buffer 310 stores downlink data of an IP layer and deletes the data upon receiving ACK for reporting transmission completion from a lower layer. The downlink buffer 310 consists of per-terminal buffers 312. That is, the per-terminal buffers 312 are allocated in accordance with the number of accessed terminals, and the downlink data is stored for each terminal.

The uplink scheduling buffer 320 temporarily stores uplink data received from the terminals, and outputs the stored uplink data according to a scheduling result of the backhaul scheduler 330. The uplink scheduling buffer 320 includes per-Quality of service Class Identifier (QCI) buffers 322. The per-QCI buffers 322 store uplink data distinctively in accordance with a Quality of Service (QoS) level of a service to which each uplink data belongs. The backhaul scheduler 330 schedules uplink transmission of the base station. Herein, the uplink data includes forwarding data provided from the handover agent 340. For example, the backhaul scheduler 330 can perform scheduling based on a WRR scheme. In this example, the backhaul scheduler 330 can assign the same weight to each of the per-QCI buffers 322 or can assign different weights thereto. Specific values of weights assigned to the uplink data and the forwarding data may vary depending on intentions of those who implement the present disclosure and a service policy of a system to which the present disclosure applies.

The handover agent 340 outputs forwarding data of the terminals so as to minimize (or reduce) a deviation of interruption times of the terminals which perform a handover. More specifically, the handover agent 340 generates a per-terminal forwarding buffer 342 when performing the handover of the terminal. Thereafter, the handover agent 340 reads the forwarding data of the terminal from the downlink buffer 310, and stores the data into the per-terminal forwarding buffer 342. The per-terminal forwarding buffer 342 is removed after the forwarding data of the terminal is entirely output. A scheduler 344 of the handover agent 340 performs scheduling on forwarding data stored per terminal in the per-terminal forwarding buffer 342. According to one exemplary embodiment of the present disclosure, the scheduler 344 performs scheduling based on an RR scheme. According to another exemplary embodiment of the present disclosure, the scheduler 344 performs scheduling based on the WRR scheme in which different weights are applied in accordance with a service level of the terminal. According to still another exemplary embodiment of the present disclosure, the scheduler 344 performs scheduling so that 'N' number of pre-defined packets is sequentially extracted from the forwarding data of each terminal. For example, when forwarding data of terminals A, B, and C is stored, the scheduler 144 extracts N packets from the forwarding data of the terminal A, then extracts N packets from the forwarding data of the terminal B, and then extracts N packets from the forwarding data of the terminal C, and such a process is repeated. The scheduler 344 outputs the forwarding data to the uplink scheduling buffer 320 in an order by which data is transmitted according to a scheduling result. In this example, the forwarding data is stored in one of the per-QCI buffers 322 in accordance with the QCI. That is, the forwarding data is scheduled by the backhaul scheduler 330 by being treated as uplink data. In this example, the scheduler 344 outputs data to the uplink scheduling buffer 320 at a speed at which data is output by the backhaul scheduler 330 to a backhaul network, that is, in a range not exceeding a data transfer rate of the backhaul network.

Figure 4:
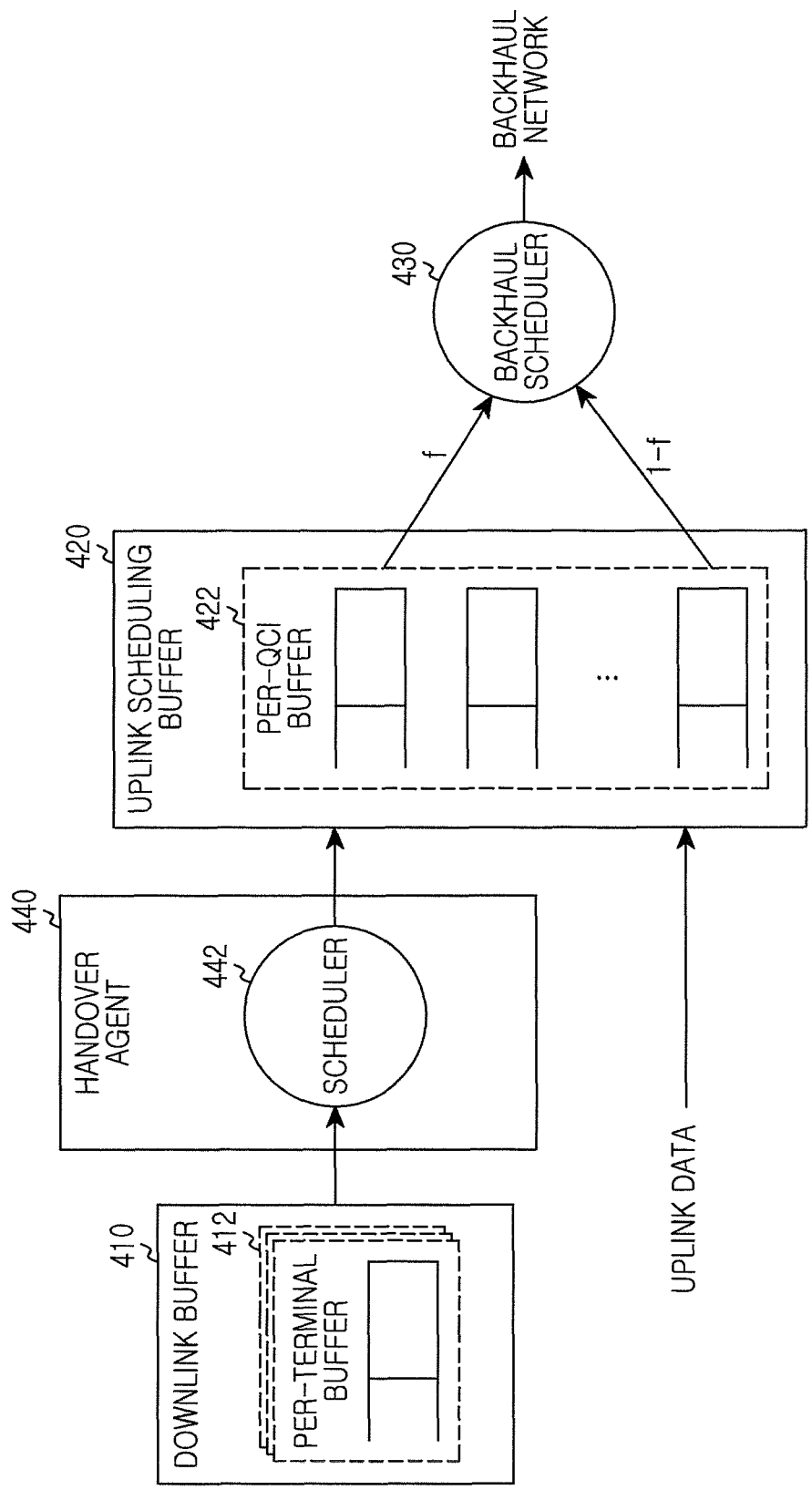
FIG. 4 illustrates a logical structure of a base station which forwards handover data in a wireless communication system according to another exemplary embodiment of the present disclosure.

FIG. 4 illustrates a logical structure of a base station which forwards handover data in a wireless communication system according to another exemplary embodiment of the present disclosure.

Referring to FIG. 4, the base station includes a downlink buffer 410, an uplink scheduling buffer 420, a backhaul scheduler 430, and a handover agent 440.

The downlink buffer 410 stores downlink data of an IP layer and deletes the data upon receiving ACK for reporting transmission completion from a lower layer. The downlink buffer 410 consists of per-terminal buffers 412. That is, the per-terminal buffers 412 are allocated in accordance with the number of accessed terminals, and the downlink data is stored for each terminal.

The uplink scheduling buffer 420 temporarily stores uplink data received from the terminals, and outputs the stored uplink data according to a scheduling result of the backhaul scheduler 430. The downlink buffer 420 consists of per-QCI buffers 422. The per-QCI buffers 422 store uplink data distinctively in accordance with a QoS level of a service to which each uplink data belongs. The backhaul scheduler 430 schedules uplink transmission of the base station. Herein, the uplink data includes forwarding data provided from the handover agent 440. For example, the backhaul scheduler 430 can perform scheduling based on a WRR scheme. In this example, the backhaul scheduler 430 can assign the same weight to each of the per-QCI buffers 422 or can assign different weights thereto. Specific values of weights assigned to the uplink data and the forwarding data may vary depending on intentions of those who implement the present disclosure and a service policy of a system to which the present disclosure applies.

The handover agent 440 outputs forwarding data of the terminals so as to minimize (or reduce) a deviation of interruption times of the terminals which perform a handover. More specifically, a scheduler 442 of the handover agent 440 performs scheduling on forwarding data stored per terminal in the per-terminal forwarding buffer 412 in the downlink buffer 410. According to one exemplary embodiment of the present disclosure, the scheduler 442 performs scheduling based on an RR scheme. According to another exemplary embodiment of the present disclosure, the scheduler 442 performs scheduling based on the WRR scheme in which different weights are applied in accordance with a service level of the terminal. According to still another exemplary embodiment of the present disclosure, the scheduler 442 performs scheduling so that 'N' number of pre-defined packets is sequentially extracted from the forwarding data of each terminal. For example, when forwarding data of terminals A, B, and C is stored, the scheduler 442 extracts N packets from the forwarding data of the terminal A, then extracts N packets from the forwarding data of the terminal B, and then extracts N packets from the forwarding, data of the terminal C, and such a process is repeated. The scheduler 442 outputs the forwarding data to the uplink scheduling buffer 420 in an order by which data is transmitted according to a scheduling result. In this example, the forwarding data is stored in one of the per-QCI buffers 422 in accordance with the QCI. That is, the forwarding data is scheduled by the backhaul scheduler 430 by being treated as uplink data. In this example, the scheduler 442 outputs data to the uplink scheduling buffer 420 at a speed at which data is output by the backhaul scheduler 430 to a backhaul network, that is, in a range not exceeding a data transfer rate of the backhaul network.

Hereinafter, a structure and operation of a base station which forwards handover data will be described in detail with reference to the accompanying drawings.

Figure 5:
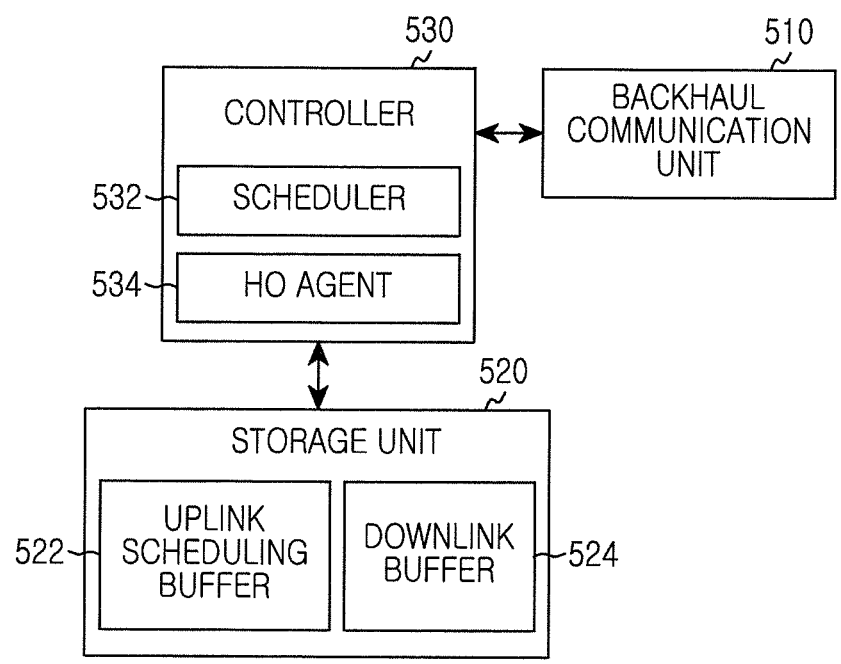
FIG. 5 illustrates a structure of a base station in a wireless communication system according to an exemplary embodiment of the present disclosure.

FIG. 5 illustrates a structure of a base station in a wireless communication system according to an exemplary embodiment of the present disclosure.

Referring to FIG. 5, the base station includes a backhaul communication unit 510, a storage unit 520, and a controller 530.

The backhaul communication unit 510 provides an interface by which the base station performs communication with a different node (e.g., a neighboring base station, through a backhaul network). That is, the backhaul communication unit 510 converts data transmitted by the base station to the different node into a physical signal, and converts a physical signal received from the different node into data.

The storage unit 520 stores a basic program, micro code, configuration information, or the like for operating the base station. Further, the storage unit 520 provides stored data at the request of the controller 530. In particular, the storage unit 520 includes an uplink scheduling buffer 522 for temporarily storing uplink data to be scheduled and a downlink buffer 524 for temporarily storing downlink data of a terminal. Further, according to one exemplary embodiment of the present disclosure, the storage unit 520 can include a forwarding buffer for storing forwarding data to be subjected to scheduling for data forwarding. Furthermore, the storage unit 520 can include a handover buffer for storing the scheduled forwarding data.

The controller 530 controls overall functions of the base station. For example, the controller 530 generates data and messages and provides them to the backhaul communication unit 510, and interprets the data and messages provided from the backhaul communication unit 510. Further, the controller 530 temporarily stores downlink data into the downlink buffer 524, and temporarily stores uplink data received from the terminal into the uplink scheduling buffer 522. A scheduler 532 included in the controller 530 performs scheduling on the uplink data stored in the uplink scheduling buffer 522. If the controller 530 generates the handover buffer in the storage unit 520 according to the exemplary embodiment of the present disclosure, the scheduler 532 also performs scheduling on forwarding data stored in the handover buffer. Herein, the scheduler 532 can perform scheduling based on a WRR scheme. In this example, the scheduler 532 can assign the same weight to the uplink data and the forwarding data or can assign a greater weight to one of the two. In addition, the scheduler 532 can also apply the WRR scheme to scheduling on the uplink data.

The controller 530 includes a HandOver (HO) agent 534 for performing scheduling on a plurality of pieces of forwarding data of a terminal which performs a handover. The HO agent 534 performs scheduling on per-terminal forwarding data. According to one exemplary embodiment of the present disclosure, the HO agent 534 performs scheduling based on the RR scheme. According to another exemplary embodiment of the present disclosure, the HO agent 534 performs scheduling based on the WRR scheme in which different weights are applied in accordance with a service level of the terminal. According to still another exemplary embodiment of the present disclosure, the HO agent 534 performs scheduling so that pre-defined N packets are sequentially extracted from the forwarding data of each terminal. If the terminals have different service levels in this example, it can be scheduled such that forwarding data of a terminal having a high level is first transmitted.

In this example, the HO agent 534 performs scheduling on forwarding data stored in the downlink buffer 524 and belonging to the terminals or performs scheduling on forwarding data stored in a per-terminal forwarding buffer and belonging to the terminals. In an example the per-terminal forwarding buffer is used, the HO agent 534 generates a per-terminal forwarding buffer in the storage unit 520 when performing a handover of the terminal, and then reads forwarding data of the terminal from the downlink buffer 524 and stores the per-terminal forwarding buffer. Further, the HO agent 534 releases the per-terminal forwarding buffer after the forwarding data of the terminal is completely output.

The forwarding buffer scheduled by the HO agent 534 is stored in the uplink scheduling buffer 522 or in the handover buffer. When using the handover buffer, the HO agent 534 generates the handover buffer in the storage unit 520, and stores forwarding data in the handover buffer in an order by which the forwarding data is transmitted according to a scheduling result. When storing the forwarding data in the handover buffer or the uplink scheduling buffer 522, the HO agent 534 outputs the forwarding data at a speed at which data is output to the backhaul network by the backhaul communication unit 510, that is, in a range not exceeding a data transfer rate of the backhaul network.

Figure 6:
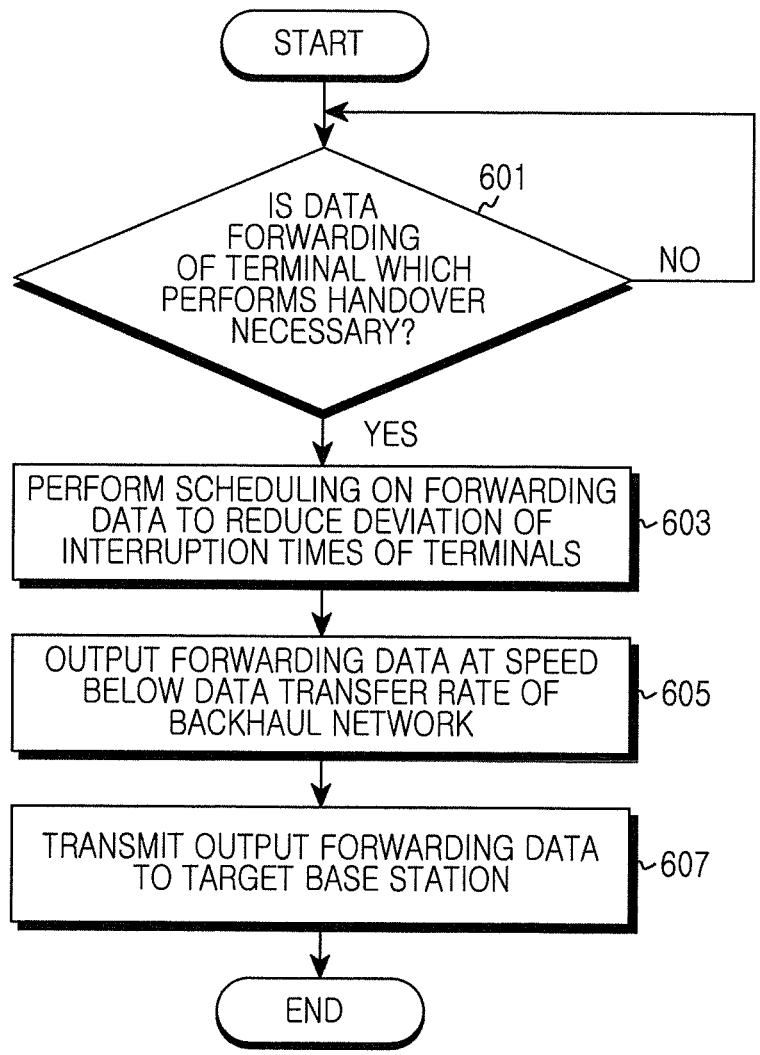
FIG. 6 illustrates an operation of a base station in a wireless communication system according to an exemplary embodiment of the present disclosure.

FIG. 6 illustrates an operation of a base station in a wireless communication system according to an exemplary embodiment of the present disclosure.

Referring to FIG. 6, the base station determines whether data forwarding of a terminal which performs a handover is necessary in step 601. That is, the base station determines whether the terminal which performs the handover exists, whether downlink data of the terminal is buffered, and whether there is data which is not completely transmitted among a plurality of pieces of buffered data.

When the data forwarding is necessary, proceeding to step 603, the base station performs scheduling on the forwarding data so as to reduce (or minimize) a deviation of interruption times of respective terminals. In this example, according to the exemplary embodiment of the present disclosure, the forwarding data can be scheduled in a state of being stored in a downlink buffer or in a state of being stored in an additional forwarding buffer for forwarding data. According to one exemplary embodiment of the present disclosure, the base station performs scheduling based on an RR scheme. According to another exemplary embodiment of the present disclosure, the base station performs scheduling based on a WRR scheme in which different weights are applied in accordance with a service level of the terminal. According to still another exemplary embodiment of the present disclosure, the base station performs scheduling so that pre-defined N packets are sequentially extracted from the forwarding data of each terminal. If the terminals have different service levels in this example, it can be scheduled such that forwarding data of a terminal having a high level is first transmitted.

In step 605, the base station outputs forwarding data scheduled in a range not exceeding a data transfer rate of a backhaul network. That is, the base station monitors the data transfer rate of the backhaul network, and outputs the scheduled forwarding data at a speed less than or equal to the data transfer rate of the backhaul network. In this example, the base station outputs the scheduled forwarding data to an uplink scheduling buffer or an additional handover buffer for forwarding data. When the data is output to the uplink scheduling buffer, the base station outputs the forwarding data to a buffer corresponding to a QoS level of a service to which the forwarding data belongs. When using the additional handover buffer, the base station generates the handover buffer, and outputs the scheduled forwarding data to the handover buffer.

In step 607, the base station transmits the output forwarding data to a target base station through the backhaul network. In this example, the base station transmits the forwarding data according to a scheduling result of a scheduler for performing transmission to the backhaul network. If the forwarding data is output to the uplink scheduling buffer in step 605, the base station performs scheduling on the forwarding data as a part of uplink data. Otherwise, if the forwarding data is output to the additional handover buffer in step 605, the base station performs scheduling on the uplink data and the forwarding data. For example, the base station can perform scheduling based on the WRR scheme. In this example, the base station can assign the same weight to the uplink data and the forwarding data or can assign a greater weight to one of the two.

According to exemplary embodiments of the present invention, a deviation of interruption times can be minimized (or reduced) by performing scheduling on data to be forwarded to a target base station in a wireless communication system. As a result, user's service satisfaction increases.

What is claimed is:

1. An apparatus for a base station in a wireless communication system, the apparatus comprising:
a storage unit comprising a first buffer configured to store downlink data for terminals performing handovers from the base station to a target base station and a second buffer configured to store uplink data from at least one terminal in a cell of the base station;
a controller comprising hardware, the controller configured to perform first scheduling on the downlink data to decrease a deviation between respective interruption times experienced by each of the terminals for the handovers being performed and to perform second scheduling on the scheduled downlink data and the uplink data; and
a communication unit configured to transmit the scheduled downlink and uplink data based on the first scheduling and the second scheduling,
wherein the second scheduling is performed by assigning a first weight to the scheduled downlink data and a second weight to the uplink data, and
wherein a first transfer rate of the data scheduled by the first scheduling is less than a second transfer rate of the data scheduled by the second scheduling.

2. The apparatus of claim 1, wherein the controller is further configured to perform the first scheduling based on a round robin (RR) scheme.

3. The apparatus of claim 1, wherein the controller is further configured to perform the first scheduling based on a weighted round robin (WRR) scheme in which different weights are applied in accordance with a service level of the terminals.

4. The apparatus of claim 1, wherein the controller is further configured to perform the first scheduling in such a manner that a pre-defined number of packets are sequentially extracted from the downlink data for the terminals.

5. The apparatus of claim 1, wherein the controller is further configured to generate a third buffer configured to store the scheduled downlink data, and output the scheduled downlink data to the third buffer.

6. The apparatus of claim 5, wherein the communication unit is further configured to output the scheduled downlink and uplink data to a backhaul network at a rate less than or equal to a data transfer rate of the backhaul network.

7. The apparatus of claim 1, wherein:
the second buffer includes per-Quality of Service Class Identifier (QCI) buffers for respective QCIs, and
the controller is further configured to output the scheduled downlink and uplink data to a buffer corresponding to a Quality of Service (QoS) level of a service to which the scheduled downlink and uplink data belongs.

8. The apparatus of claim 7, wherein the communication unit is further configured to output the scheduled downlink and uplink data to a backhaul network at a rate less than or equal to a data transfer rate of the backhaul network.

9. The apparatus of claim 1, wherein the controller is further configured to:
generate a third buffer configured to store the downlink data for each of a number of terminals performing handover to the target base station,
classify the downlink data stored in the third buffer, and perform the first scheduling on the downlink data.

10. The apparatus of claim 1, wherein:
the downlink data and the uplink data are both transmitted on a backhaul link of the base station, and
wherein the first weight is greater than the second weight.

11. A method of operating a base station in a wireless communication system, the method comprising:
storing, in a first buffer, downlink data for terminals performing handovers from the base station to a target base station;
storing uplink data from at least one terminal in a cell of the base station in a second buffer;
performing first scheduling on the downlink data to decrease a deviation between respective interruption times experienced by each of the terminals for the handovers being performed;
performing second scheduling on scheduled downlink data and the uplink data; and
transmitting the scheduled downlink data and uplink data based on the first scheduling and the second scheduling,
wherein the second scheduling is performed by assigning a first weight to the scheduled downlink data and a second weight to the uplink data, and
wherein a first transfer rate of the data scheduled by the first scheduling is less than a second transfer rate of the data scheduled by the second scheduling.

12. The method of claim 11, wherein the first scheduling is performed based on a round robin (RR) scheme.

13. The method of claim 11, wherein the first scheduling is performed based on a weighted round robin (WRR) scheme in which different weights are applied in accordance with a service level of the terminals.

14. The method of claim 11, wherein the first scheduling is performed in such a manner that a pre-defined number of packets are sequentially extracted from the downlink data for the terminals.

15. The method of claim 11, further comprising:
generating a third buffer for storing the scheduled downlink data; and
outputting the scheduled downlink data to the second buffer.

16. The method of claim 15, wherein outputting the scheduled downlink data comprises:
outputting the scheduled downlink data and uplink data to a backhaul network at a rate less than or equal to a data transfer rate of the backhaul network.

17. The method of claim 11, further comprising:
outputting the scheduled downlink and uplink data to a buffer corresponding to a Quality of Service (QoS) level of a service to which the scheduled downlink and uplink data belongs;
wherein the second buffer includes per-Quality of Service Class Identifier (QCI) buffers for respective QCIs.

18. The method of claim 11, further comprising:
outputting the scheduled downlink and uplink data to a backhaul network at a rate less than or equal to a data transfer rate of the backhaul network.

19. The method of claim 11, further comprising:
generating a third buffer for storing the scheduled downlink and uplink data; and
classifying the downlink data stored in the third buffer to be scheduled.

20. The method of claim 11, wherein:
the downlink data and the uplink data are both transmitted on a backhaul link of the base station, and
wherein the first weight is greater than the second weight.

* * * * *